United States Patent
Pan et al.

(10) Patent No.: US 9,239,954 B2
(45) Date of Patent: Jan. 19, 2016

(54) IMAGE PROCESSING DEVICE, IMAGE PROCESSING METHOD, SCANNER AND STORAGE MEDIUM

(71) Applicant: FUJITSU LIMITED, Kawasaki-shi (JP)

(72) Inventors: Pan Pan, Beijing (CN); Yuan He, Beijing (CN); Jun Sun, Beijing (CN); Satoshi Naoi, Beijing (CN)

(73) Assignee: FUJITSU LIMITED, Kawasaki (JP)

( * ) Notice: Subject to any disclaimer, the term of this patent is extended or adjusted under 35 U.S.C. 154(b) by 218 days.

(21) Appl. No.: 13/906,854

(22) Filed: May 31, 2013

(65) Prior Publication Data

US 2013/0322769 A1 Dec. 5, 2013

(30) Foreign Application Priority Data

May 31, 2012 (CN) .......................... 2012 1 0177619

(51) Int. Cl.

| | |
|---|---|
| *G06K 9/00* | (2006.01) |
| *G06K 9/32* | (2006.01) |
| *G06K 9/46* | (2006.01) |
| *G06T 7/00* | (2006.01) |
| *G06T 5/40* | (2006.01) |
| *G06T 5/00* | (2006.01) |
| *G06K 9/48* | (2006.01) |

(52) U.S. Cl.
CPC .............. *G06K 9/00463* (2013.01); *G06K 9/32* (2013.01); *G06K 9/4638* (2013.01); *G06T 5/002* (2013.01); *G06T 5/40* (2013.01); *G06T 7/0085* (2013.01); *G06K 2009/485* (2013.01); *G06K 2209/01* (2013.01); *G06T 2207/20192* (2013.01); *G06T 2207/30176* (2013.01)

(58) Field of Classification Search
None
See application file for complete search history.

(56) References Cited

U.S. PATENT DOCUMENTS

| | | | | |
|---|---|---|---|---|
| 5,841,905 A | * | 11/1998 | Lee ................................ | 382/203 |
| 5,872,864 A | * | 2/1999 | Imade et al. ................... | 382/176 |
| 6,002,793 A | * | 12/1999 | Silver et al. .................... | 382/152 |

(Continued)

FOREIGN PATENT DOCUMENTS

| | | |
|---|---|---|
| CN | 1815492 | 8/2006 |
| CN | 101567084 | 10/2009 |
| WO | WO 2010/140159 | 12/2010 |

OTHER PUBLICATIONS

Wen Gong-jian et al., "A Robust Approach to Extracting Straight Lines," *Journal of Software*, vol. 12, No. 11, 2001.

(Continued)

*Primary Examiner* — Kim Vu
*Assistant Examiner* — Nathan Bloom
(74) *Attorney, Agent, or Firm* — Staas & Halsey LLP

(57) ABSTRACT

The disclosure provides an image processing device, image processing method, scanner and storage medium. The image processing device is used for tracing a boundary of an object image in an image, the boundary being continuous and the rate of change in slope between adjacent points on the boundary being slow. The image processing device includes: a boundary estimation unit, adapted to estimate the location of the boundary of the object image; an interfering gradient processing unit, adapted to process an interfering gradient near the estimated boundary, so as to reduce the interfering gradient or remove the interfering gradient from the image; and a boundary tracing unit, adapted to trace the boundary in the image having the interfering gradient processed. By using the technique of the disclosure, the accuracy of tracing a boundary of an image is improved significantly.

16 Claims, 8 Drawing Sheets

(56) References Cited

U.S. PATENT DOCUMENTS

| | | |
|---|---|---|
| 6,266,054 B1 * | 7/2001 | Lawton et al. ............... 345/581 |
| 2002/0063893 A1 * | 5/2002 | Fujieda ...................... 358/1.15 |
| 2006/0193533 A1 * | 8/2006 | Araki et al. .................. 382/275 |
| 2008/0008369 A1 * | 1/2008 | Koptenko et al. ............ 382/128 |
| 2011/0075882 A1 * | 3/2011 | Guo et al. .................... 382/100 |
| 2011/0158474 A1 | 6/2011 | Srikrishnan et al. |
| 2012/0218571 A1 * | 8/2012 | Kan ............................... 358/1.9 |
| 2012/0294528 A1 * | 11/2012 | Li et al. ........................ 382/173 |
| 2013/0223737 A1 * | 8/2013 | Anbai et al. .................. 382/170 |

OTHER PUBLICATIONS

Chinese Office Action mailed Aug. 20, 2015 in corresponding Chinese Application No. 201210177619.0.

* cited by examiner

IMAGE PROCESSING DEVICE, IMAGE PROCESSING METHOD, SCANNER AND STORAGE MEDIUM

CROSS REFERENCE TO RELATED APPLICATION

This application relates to the subject matter of the Chinese patent application for invention, Application No. 201210177619.0, filed with China's State Intellectual Property Office on May 31, 2012. The disclosure of this Chinese application is considered part of and is incorporated by reference in the disclosure of this application.

FIELD OF THE INVENTION

The disclosure relates to a field of image processing, and particularly to an image processing device, image processing method, scanner and storage medium for tracing a boundary.

BACKGROUND OF THE INVENTION

Distortion usually occurs to an image obtained by performing an image obtaining operation, such as photographing or scanning, on a stereoscopic object. Take a document scanning as an example, distortion, such as perspective transformation and tensile deformation, exists in a scanned image regardless of a traditional flat panel scanner or an advanced curved surface scanner. In addition, take a product logo identification application for an example, there is distortion in an image obtained by photographing a logo on a product such as a beverage bottle, and thus accuracy of identification is affected.

Therefore, to remove distortion, enrich document edition, and improve accuracy of content identification, it is important to obtain an accurate boundary of an image of a document or a logo. In this context, various boundary tracing technologies, for example a dynamic planning technology, have been researched and used widely.

SUMMARY OF THE INVENTION

However, when a traditional boundary tracing technology such as the dynamic planning is used, boundary extraction will be interfered by gradient information of content in an object image to be traced or surrounding environment of an object image to be traced, and thus accuracy of boundary tracing is affected. Content in an object image may be for example contents such as patterns and characters in a document image or a logo image, etc. The surrounding environment of an object image may be for example background textures of a table on which a document is placed, or patterns of a commodity to which a log image is attached. Specifically, when a gradient of the content or of the background environment around the boundary is relatively intense, lines, etc., in the content or in the background environment may be regarded as a boundary in error by a conventional boundary tracing technology, and an error tracing is caused.

In view of the above problem, the disclosure provides an image processing device, image processing method, scanner and storage medium which remove affection of gradient of the content or the background of an object image by using global information of a boundary. It aims to estimate preliminarily a location of a boundary prior to the use of the traditional boundary tracing technology, and then to reduce or remove content and/or background gradient near the estimated boundary location to thereby avoid affection on subsequent boundary tracing processes. The technique according to the disclosure is particularly applicable for a case where a boundary of an object image is continuous and a rate of change in slope between adjacent points on the boundary is slow.

According to an embodiment of the invention, there is provided an image processing device for tracing a boundary of an object image in an image, the boundary being continuous and a rate of change in slope between adjacent points on the boundary being slow, the image processing device comprising: a boundary estimation unit adapted to estimate a location of a boundary of an object image; an interfering gradient processing unit adapted to process an interfering gradient near an estimated boundary, so as to reduce the interfering gradient or remove the interfering gradient from the image; and a boundary tracing unit adapted to trace a boundary in the image having the interfering gradient processed.

In an embodiment, the boundary estimation unit comprises: a segmentation unit adapted to segment a portion of the image between two corners on the boundary into a predetermined number of segments; and a segment boundary estimation unit, adapted to estimate a location of a boundary respectively in each of the segments.

In an embodiment, the segment boundary estimation unit comprises a boundary approximation unit for approximating the boundary in each of the segments using a straight line segment, the boundary approximation unit is adapted to, for at least one of outermost segments where the corners are in respectively, set the corner in the outermost segment as a start point of a first straight line segment used to approximate the boundary in the outermost segment, and select an end point for the first straight line segment on a first segmentation line resulting in the outermost segment, so that in a gradient histogram of a narrow band covering the first straight line segment, pixels exhibit the greatest degree of concentration with respect to the greatest gradient; and the boundary approximation unit is further adapted to set the obtained end point of the boundary-approximating straight line segment as a start point of a second straight line segment used to approximate the boundary in a next, adjacent segment, and select an end point for the second straight line segment on a second segmentation line which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient.

In an embodiment, the segment boundary estimation unit further comprises an evaluation unit adapted to evaluate usability of an approximating straight line segment obtained by the boundary approximation unit.

In an embodiment, the evaluation unit comprises: a concentration degree evaluation unit, adapted to determine whether a degree at which the pixels concentrate on the greatest gradient is larger than or equal to a predetermined degree, and if it is larger than or equal to the predetermined degree, the concentration degree evaluation unit determines that the approximating straight line segment of the boundary is available; otherwise, the concentration degree evaluation unit determines the approximating straight line segment of the boundary is unavailable.

In an embodiment, the evaluation unit comprises an inclination angle evaluation unit, adapted to compare an inclination angle of a newly-obtained approximating straight line segment with an inclination angle of an approximating straight line segment in a previous, adjacent segment, and if the difference between the inclination angles is smaller than or equal to a predetermined threshold, the inclination angle evaluation unit determines the approximating straight line segment is available; otherwise, the inclination angle evaluation unit determines the approximating straight line segment is unavailable.

In an embodiment, the interfering gradient processing unit is adapted to process gradient near the approximating straight line segment for each of the segments.

In an embodiment, the interfering gradient processing unit is adapted to process gradient in a predetermined region except for a narrow band including the approximating straight line segment.

In an embodiment, when an approximating straight line segment in the outermost segment is unavailable, the interfering gradient processing unit is adapted to process gradients except for the narrow band having a predetermined width above or under a horizontal line where corners are in; and the boundary tracing unit is adapted to trace a boundary of an object image for the image subjected to the process.

In an embodiment, when approximating is only started from a corner at one end, and an approximating straight line segment of a certain segment is unavailable, the interfering gradient processing unit is adapted to connect an end point of an approximating straight line segment of the last segment for which the approximating is available to a corner at the other end, and to process the gradient of the connecting line at the side where the boundary does not exist.

In an embodiment, when approximating is started simultaneously from corners at both ends, and an approximation of a segment at a certain side or at both sides is unavailable, the interfering gradient processing unit is adapted to connect an end point of an approximating straight line segment of the last segment for which the approximating is available to an end point of an approximating straight line segment of the last segment for which the approximating is available at the other side, and to process the gradient of the connecting line at the side where the boundary does not exist.

In an embodiment, the object image described in the above embodiments is a document image.

According to an embodiment of the invention, there is provided a scanner comprising an image processing device according to any one of the embodiments.

According to an embodiment of the invention, there is provided an image processing method, for tracing a boundary of an object image in an image, the boundary being continuous and a rate of change in slope between adjacent points on the boundary being slow, the image processing method comprising: a boundary estimation step of estimating a location of a boundary of an object image; an interfering gradient processing step of processing an interfering gradient near the estimated boundary, so as to reduce the interfering gradient or remove the interfering gradient from the image; and a boundary tracing step of tracing a boundary in the image having the interfering gradient processed.

According to an embodiment of the invention, there is provided a computer readable storage medium storing with computer program causing a computer to execute a process of tracing a boundary of an object image in an image, the bounding being continuous, and the rate of change in slope between adjacent points being slow, the processing comprising: estimating a location of a boundary of an object image; processing an interfering gradient near the estimated boundary to reduce the interfering gradient or remove the interfering gradient from the image; and tracing the boundary in the image having the interfering gradient processed.

By using the image processing device, image processing method, scanner and computer readable storage medium according to the invention, a pre-process may be performed to an image before a traditional boundary tracing process is performed, specifically, by estimating preliminary a location of a boundary, content and/or background gradient near the estimated location may be reduced or removed to reduce a possibility of erroneous tracing of a boundary, and improve accuracy of tracing a boundary. Thus, it is helpful to enrich document edition and improve accuracy of identifying a logo.

BRIEF DESCRIPTION OF THE DRAWINGS

The above and other objects, features and advantages of the invention may be understood more easily by referring to description of the embodiments of the invention provided in conjunction with the Drawings, in which the same or corresponding technical feature or component is represented by the same or corresponding reference sign, and in which the size and the relative position of the unit are not necessarily drawn in ratio.

DETAILED DESCRIPTION OF THE INVENTION

Figure 1:
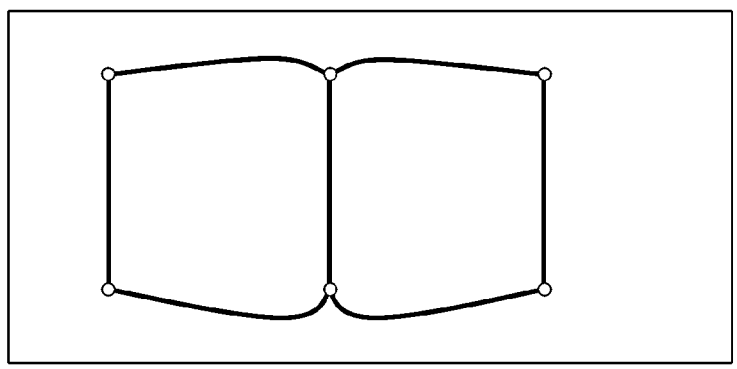
FIG. 1 is a schematic view showing an image obtained by scanning a document by a scanner.

Embodiments of the invention will be described below by referring to the Drawings. It shall be noted that denotation and description of a component and a process which are not related to the invention or which are well know to those skilled in the art are omitted in the description and drawings for the sake of clearness.

To facilitate description, a document image obtained by scanning is taken as an example hereinafter for describing the image processing device and the image processing method according to an embodiment of the invention.

Figure 2:
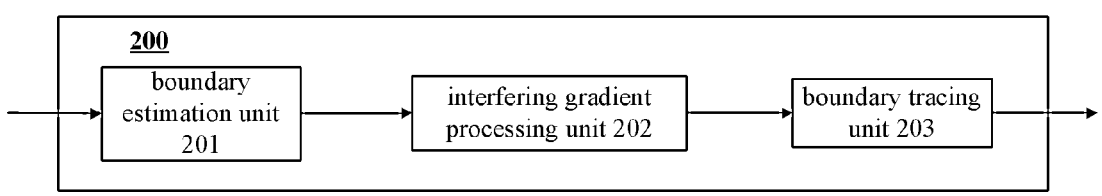
FIG. 2 is a function block diagram showing a boundary tracing unit according to an embodiment of the invention.

FIG. 1 is a schematic view showing an image obtained by scanning a document by a scanner. Wherein, contents in the document are omitted, and "○" is used to indicate a corner of a document image. As can be seen from FIG. 1, a distortion occurs to upper and lower boundaries of the document image. To facilitate to further edit the document image, there is a need of tracing upper and lower boundaries accurately. FIG. 2 is a function block diagram showing a boundary tracing device 200 according to an embodiment of the invention.

As shown in FIG. 2, a boundary tracing device 200 comprises: a boundary estimation unit 201 adapted to estimate a location of a boundary of an object image, an interfering gradient processing unit 202 adapted to process an interfering gradient near the estimated boundary so as to reduce the interfering gradient or remove the interfering gradient from the image, and a boundary tracing unit 203 adapted to trace a boundary in the image having the interfering gradient processed. Hereinafter, description will be given by taking a document image as an example of an object image, and it shall be understood that the technique of the disclosure may be applied to any other object images which need a boundary tracing, such as a product logo image, as long as the boundary to be traced is continuous and a rate of change in slope between adjacent points on the boundary is slow.

The boundary estimation unit 201 estimates a location of a boundary of an object image obtained by image obtaining operations such as scanning. Specifically, for the document image shown in FIG. 1, the boundary estimation unit 201 may estimate locations of upper and lower boundaries of the document image. Here, the boundary estimation unit 201 performs a function of locating preliminary a boundary to obtain approximate locations of boundaries of the document to facilitate subsequent gradient processing operations. The boundary estimation unit 201 may estimate the location of the boundary of the document by using various methods well known in the art. For example, a preliminary boundary detecting technique such as Sobel operator may be used. A location of a boundary may be even marked manually in the document image.

After obtaining the location of the estimated boundary, the interfering gradient processing unit 202 may selectively process an interfering gradient around the location. For example, reduce or remove an interfering gradient from an image. For instance, when the boundary estimation unit 201 estimates the location of the lower boundary of the document image shown in FIG. 1, the interfering gradient processing unit 202 may reduce or remove gradient of each of pixels in an adjacent region above the lower boundary.

First of all, it needs to be noted that as can be appreciated by those skilled in the art, various processes performed on an image in embodiments listed by the disclosure are carried out on a gradient map of a curved area of a boundary of an entire image or an object image. In the disclosure, to show the attached drawings much clearly, a reverse gradient map with while background and black gradient is used in each of the examples of Figures (FIGS. 4-6, and FIGS. 8-10). In an inverse gradient map, an inverse gradient value=255-orignal gradient value. For example, in a normal gradient map, a gradient value of a greatest gradient is 255, and a gradient value of a minimum gradient is 0. Then, in an inverse gradient map, a gradient value of a greatest gradient is 0, and a gradient value of a minimum gradient is 255.

In an embodiment using such a reverse gradient map, the interfering gradient processing unit 202 may set a gradient value in a region (a region to be processed) around a location of a boundary to be 255 (equivalent to removing a gradient), or may increase a gradient value in a region to be processed by a predetermined rule (equivalent to reducing a gradient). For example, when a gradient value corresponding to a certain pixel in a region to be processed is 120, the gradient value may be multiplied by 2 to obtain a gradient value of 240 to reduce a gradient. Reducing a gradient, instead of removing a gradient, may prevent from erroneously removing of a real boundary when the location of the boundary estimated by the boundary estimation unit 201 is inaccurate. Similarly, when other textures are in a background (such as a scanning table) of a document image, the same process may be performed on an adjacent region below the lower boundary.

Of course, in an embodiment using a normal gradient map (black background), the interfering gradient processing unit 202 may process a gradient in a region to be processed. For instance, set all of the gradient values in the region to be processed to be 0. That is, remove an interfering gradient. Or, to prevent from erroneously removing of a real boundary when the location of the boundary estimated by the boundary estimation unit 201 is inaccurate, the interfering gradient processing unit 202 may decrease a gradient value in the region to be processed by a predetermined rule. The predetermined rule for example may be a rule of dividing the gradient value by an integer (for example, 2, 3) or subtracting from the gradient a fixed number. Thus, gradient in the region to be processed is reduced. Hereinafter, to display clearly, a case using an inverse gradient map is described illustratively only.

A document image having interfering gradient processed is delivered to the boundary tracing unit 203. The boundary tracing unit 203 may trace a boundary for the document image having interfering gradient processed by using various boundary tracing technologies well known in the art such as a dynamic planning.

Figure 3:
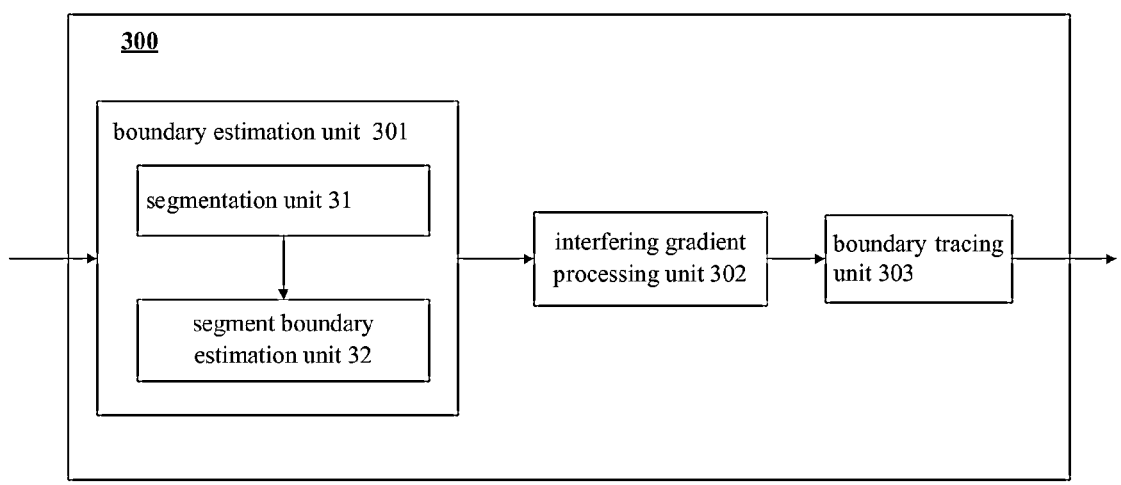
FIG. 3 is a function block diagram showing a boundary tracing unit according to an embodiment of the invention.

Obviously, the accuracy of the location of the estimated boundary affects greatly the validity of removing an interfering gradient and thus affects greatly an accuracy of boundary tracing. The embodiment according to FIG. 3 aims to improve an accuracy of a location of an estimated boundary. FIG. 3 is a function block diagram showing a boundary tracing device 300 according to an embodiment of the invention. The boundary tracing unit 303 in the boundary tracing device 300 has the same function and configuration as the boundary tracing unit 203 in the boundary tracing device 200, and the detailed descriptions are omitted.

The boundary tracing device 300 comprises: a boundary estimation unit 301, an interfering gradient processing unit 302 and a boundary tracing unit 303. Wherein, the boundary estimation unit 301 comprises a segmentation unit 31 and a segment boundary estimation unit 32. The segmentation unit 31 is adapted to segment a portion of the image between two corners on the boundary into a predetermined number of segments. The segment boundary estimation unit 32 is adapted to estimate the location of the boundary respectively in each of the segments.

Figure 4:
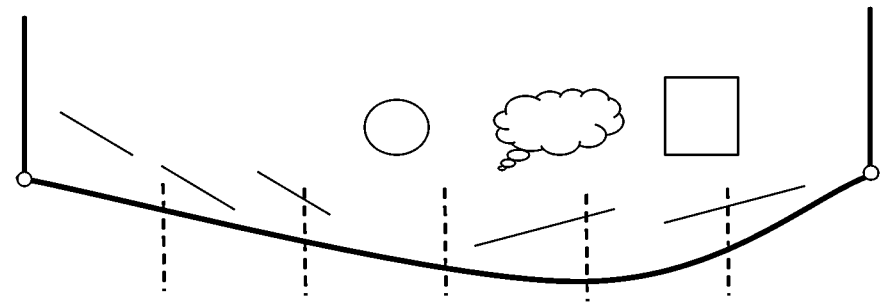
FIG. 4 is a schematic view illustratively showing segmenting a lower boundary at a side of a document binding line in the document image shown in FIG. 1.

FIG. 4 is a schematic view showing illustratively segmenting a lower boundary at a side of a document binding line in the document image shown in FIG. 1. FIG. 4 further illustratively shows document contents that may affect a boundary tracing. In case of two given corners, the segmentation unit 41 for example may obtain a predetermined number of segments on the boundary in a simplest manner: segmenting evenly a segment between two corners using a segmentation line perpendicular to a connecting line of two corners to segment a boundary curve. In the embodiment shown in FIG. 4, the boundary is segmented into 6 segments. Of course, any other segmentation manner may be selected on the basis of a design demand. For instance, a boundary may be segmented by using a segment line inclined to a connecting line of two corners or by segmenting unevenly a connecting line of corners. The number of the segment segmented is determined upon a distance between corners at both ends of the boundary, required boundary estimation preciseness, etc. For example, 5 to 20 segments may be selected. A compromise is made between the system calculation amount and the boundary estimation preciseness.

A corner of a boundary may be determined in different manners. For example, a corner of a boundary may be detected automatically by using various corner detecting methods well known in the art. Or, a corner is determined by a manual input.

Figure 7:
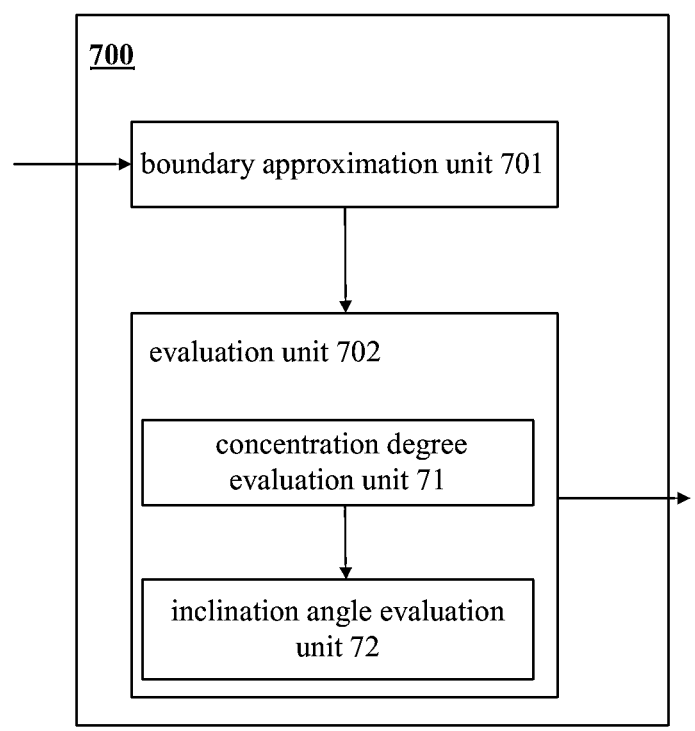
FIG. 7 is a block diagram illustratively showing a function structure of an example of a segment boundary estimation unit according to an embodiment of the invention.

The segment boundary estimation unit 32 may estimate a location of a boundary automatically or inputting-manually using well know methods according to the segmented segments. FIG. 7 is a block diagram illustratively showing a function structure of an example 700 of a segment boundary estimation unit according to an embodiment of the invention.

In the embodiment shown in FIG. 7, the segment boundary estimation unit 700 may comprise: a boundary approximation unit 701 adapted to approximate the boundary in each of the segments using a straight line segment, and an evaluation unit 702 adapted to evaluate usability of an approximating straight line segment obtained by the boundary approximation unit 701. Wherein, the evaluation unit 702 may comprise: a concentration degree evaluation unit 71 and an inclination angle evaluation unit 72. Hereinafter, functions of those units will be described in detail by referring to FIGS. 5 and 6, respectively.

Figure 5:
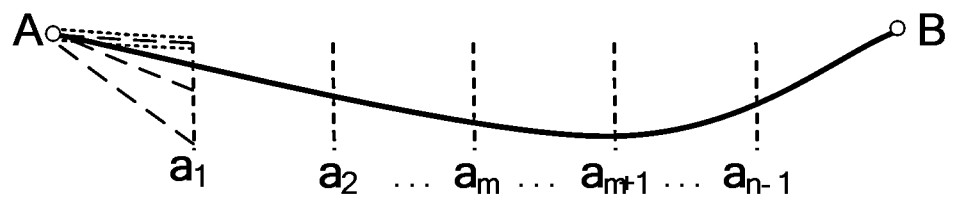
FIG. 5 is an explanatory view illustratively showing a boundary approximating process performed by a boundary approximating unit according to an embodiment of the invention.

FIG. 5 is an explanatory view illustratively showing a boundary approximating process performed by the boundary approximating unit 701 according to an embodiment of the invention. As shown in FIG. 5, first of all, the boundary approximation unit 701 starts to perform a boundary approximating process at an outermost segment (that is, a segment where a corner is in) among all of the segments. According to a characteristic of a boundary of an object image and a demand for designing, a boundary approximating may be selected to be performed simultaneously from two outermost segments, or a boundary approximating is performed only from one outermost segment. In the embodiment shown in FIG. 5, considering the fact that distortion occurs badly to a boundary near the binding line of the document, a boundary approximating is only performed from the outermost segment in which corner A locates and that is away from the binding line of the document.

Specifically, the boundary approximation unit 701 sets the corner A in the outermost segment as a start point of a straight line segment used to approximate the boundary in the outermost segment, and selects an end point for the straight line segment on a segmentation line a1 resulting in the outermost segment, so that in a gradient histogram of a narrow band covering the straight line segment, pixels exhibit the greatest degree of concentration with respect to the greatest gradient. Much detailed descriptions are given by referring to formula (1) later.

When an end point of a boundary-approximating straight line segment on a segment line a1 in the outermost segment has been obtained, the boundary approximation unit 701 sets the obtained end point as a start point of a straight line segment used to approximate the boundary in a next, adjacent segment. Then, the boundary approximation unit 701 selects an end point for the straight line segment used to approximate on a segmentation line (a2) which results in the next segment and is not common to the next segment and the segment for which the boundary-approximating straight line segment has been obtained, so that in a gradient histogram of a narrow band covering the approximating straight line segment, pixels exhibit the greatest degree of concentration with respect to the greatest gradient.

By analogy, when an end point of a boundary-approximating straight line segment of a segment m (m=1 . . . n–1, n is the total number of segments) counted from outermost segment on a segment line $a_m$ has been obtained, the boundary approximation unit 701 sets the obtained end point as a start point of a straight line segment used to approximate a boundary in m+1 segment. Then, the boundary approximation unit 701 selects an end point for the straight line segment used to approximate on a segmentation line which results in the segment m+1 and is not common to the segment m and the segment m+1, that is, on the segment line $a_{m+1}$, so that in a gradient histogram of a narrow band covering the approximating straight line segment, pixels exhibit the greatest degree of concentration with respect to the greatest gradient. The approximating straight line segments for all segments of the boundary between the two corners are thereby obtained.

In other words, a start point is fixed for a boundary-approximating straight line segment (including boundary-approximating straight line segments in segments other than the outermost segment). That is, the start point is a corner or an end point of an approximating straight line segment of the boundary of the previous segment. However, an end point needs to be selected on a segment line different from the segment line where a corner locates or the end point of the previous segment obtained by approximating locates. For example, one possible end point may be selected every predetermined distance on the segment line, or one possible end point is selected by going through all of points on the segment line to form a possible approximating straight line segment with the start point. Then, a selection of approximating straight line segment is made in accordance with a principle where in a gradient histogram of a narrow band covering the possible approximating straight line segment (for example making the approximating straight line segment as a center line) pixels exhibit the greatest degree of concentration with respect to the greatest gradient.

For each possible approximating straight line segment, a gradient histogram of an adjacent region (for example, a narrow band) is calculated. As shown in FIG. 5, "- -", is used to indicate a possible approximating straight line segment, and a narrow band is a portion between two "......" segments. For each possible straight line segment, a corresponding gradient histogram may be calculated. For one gradient histogram, the abscissa is the gradient value, and ordinate is the number of corresponding pixels.

In the embodiment using an inverse gradient map, a position of the gradient value 0 of a gradient histogram obtained according to the inverse gradient map corresponds to the greatest gradient, and the position of the gradient value 255 corresponds to the minimum gradient. A most possible approximating straight line segment may be selected by seeking a gradient k of $\alpha$ fractile showing a degree at which the pixels concentrate on the greatest gradient in the gradient histogram.

As shown in formula 1), a gradient value k which exceeds $\alpha$ (for example, $\alpha$=0.95) fractile may be obtained by calculation:

$$\text{argmin}_k \left( \sum_{i=0}^{k} h_i \geq 0.95 * \sum_{i=0}^{255} h_i \right) \quad (1)$$

and the segment having the minimum k value (gradient is minimum) is the most possible segment, and thus a boundary-approximating straight line segment of a segment is obtained.

Of course, in another embodiment, a normal gradient map may be used. In a gradient histogram obtained on the basis of the normal gradient map, the position of the gradient value 255 of the gradient histogram corresponds to the greatest gradient, and the position of the gradient value 0 of the gradient histogram corresponds to the minimum gradient. In such a case, a most possible approximating straight line segment may be selected by seeking a gradient k showing a degree at which the pixels concentrate on the greatest gradient in the gradient histogram through the formula (2).

$$\text{argmax}_k \left( \sum_{i=k}^{255} h_i \geq 0.95 * \sum_{i=0}^{255} h_i \right) \quad (2)$$

In case of using a normal gradient map, a segment having the maximum k value calculated by formula (2) is the most possible segment, and thus a boundary-approximating straight line segment of a segment is obtained.

The segment boundary estimation unit may include only the boundary approximation unit. After an approximating straight line segment of a boundary of a segment is obtained by the boundary approximation unit, the approximating straight line segment is directly delivered to the interfering gradient processing unit for subsequent interfering gradient process.

In addition, to improve accuracy of estimating a boundary, as shown in FIG. 7, the segment boundary estimation unit may further include the evaluation unit 702 adapted to evaluate a usability of the approximating straight line segment obtained by the boundary approximation unit 701. Evaluating usability of an approximating straight line segment is to determine whether the approximating straight line segment approaches sufficiently a real boundary, or to determine whether a possibility that the approximating straight line segment approaches sufficiently a real boundary is high enough. Evaluation may be performed by using various determination means and standards well known in the art. For example, an evaluation may be made by using a relation between a degree at which the pixels concentrate on the greatest gradient and the predetermined degree as a standard. Or, for example, an evaluation is made by using a difference between inclination angles of the obtained possible approximating straight line segment and the approximating straight line segment of the previous segment as a rule. When it is determined that the approximating straight line segment is available, the approximating straight line segment may be used as an location of the estimated boundary, to reduce or remove an interfering gradient near the position from the image. When it is determined that the approximating straight line segment is unavailable, whether to reduce or remove gradient near the approximating straight line segment may be selected according to actual requirements.

In the embodiment of FIG. 7, the evaluation unit 702 for example may comprise a concentration degree evaluation unit 71 and an inclination angle evaluation unit 72.

The concentration degree evaluation unit 71 may be used to determine whether a gradient of the position where the approximating straight line segment obtained by the boundary approximation unit 701 locates is intense enough. In other words, the concentration degree evaluation unit 71 may determine whether a degree at which the pixels concentrate on the greatest gradient in the above described gradient histogram is larger than or equal to a predetermined degree.

In case of using an inverse gradient histogram, whether the concentration of pixels with respect to the greatest gradient is larger than or equal to a predetermined degree may be evaluated by using gradient k of α fractile described in formula (1). For example, in an embodiment, when k is smaller than or equal to a threshold Th1, it may be deemed that the concentration of the pixels with respect to the greatest gradient is larger than or equal to a predetermined degree; when k is larger than the threshold Th1, it may be deemed that a degree at which the pixels concentrate on the greatest gradient is smaller than a predetermined degree. The value of Th1 may be for example a value smaller than or equal to 245, preferably between 128 and 255. When the concentration degree is larger than or equal to the predetermined degree, the concentration degree evaluation unit 72 determines the boundary-approximating straight line segment is available; and when the concentration degree is smaller than a predetermined degree, the concentration degree evaluation unit 71 determines the boundary-approximating straight line segment is unavailable.

When the concentration degree evaluation unit 71 determines the boundary-approximating straight line segment is available, alternatively, the inclination angle evaluation unit 72 may be used to further validate the usability of the approximating straight line segment.

The inclination angle evaluation unit 72 may compare an inclination angle of a newly-obtained approximating straight line segment with an inclination angle of an approximating straight line segment in a previous, adjacent segment. If the difference between the inclination angles is smaller than or equal to a predetermined threshold Th2, the inclination angle evaluation unit 72 determines the approximating straight line segment is available; if the difference between the inclination angles is larger than a predetermined threshold Th2, the inclination angle evaluation unit 72 determines the approximating straight line segment is unavailable. According to a specific condition, Th2 may be a value between 0 degree and 90 degree. For example, Th2 may be 8 degree.

Figure 6:
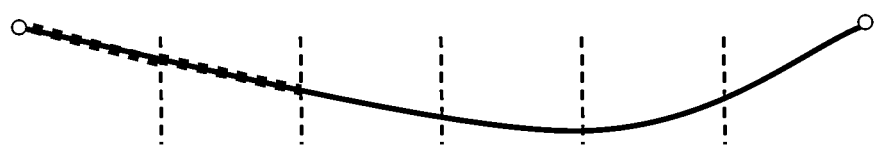
FIG. 6 is an explanatory view illustratively showing an inclination of an approximating straight line segment of a boundary of two adjacent segments.

FIG. 6 is an explanatory view illustratively showing inclinations of approximating straight line segments of boundaries of two adjacent segments. As can be seen intuitionisticly from FIG. 6, when it is given that the boundary is continuous and a rate of change in slope between adjacent points is slow, when an approximating straight line approaches sufficiently a real boundary, a change in inclination angles of the approximating straight line segments of two adjacent segments is very small. That is, the difference between inclination angles of approximating straight line segments of two adjacent segments will be smaller than the predetermined threshold Th2. In some embodiment, the concentration degree evaluation unit may not be used, and only the inclination angle evaluation unit 72 is set to evaluate the possible approximating straight line segment.

Return back to FIG. 3. When a result of boundary-approximating performed in the boundary estimation unit 301 is input to the interfering gradient processing unit 302, the interfering gradient processing unit 302 processes gradient near the approximating straight lines in each of the segments, respectively. For instance, the interfering gradient processing unit 302 reduces or removes gradient in a predetermined region except for the narrow band covering the approximating straight line segment, as shown by the former two segments counted from the left in FIG. 8.

Figure 8:
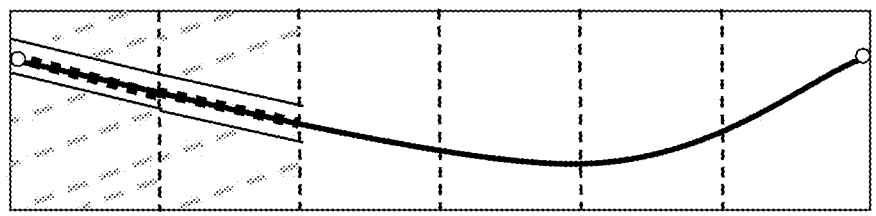
FIG. 8 is an explanatory view illustratively showing an example of a first case of interfering gradient processing according to an embodiment of the invention.

FIG. 8 is an explanatory view illustratively showing an example of a first case of interfering gradient processing according to an embodiment of the invention. Take a document image as an example, in case that approximating straight line segments of two segments have been obtained successfully starting from the outermost corner, the interfering gradient processing unit 302 may perform an interfering gradient process on the two segments. The specific processing method may be the following: for each of the segments, processing gradient in a predetermined region (such as the rectangular region near the boundary shown in FIG. 8) except for the narrow band covering the approximating straight line segment. The processed portion is shown by the hatching portion. The predetermined region on which the gradient process is performed may be set on the basis of a characteristic of an object image and a distribution characteristic of an interfering content. The specific examples of processing have been described above.

Figure 9:
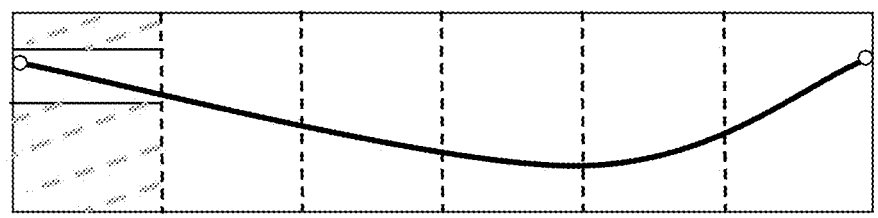
FIG. 9 is an explanatory view illustratively showing an example of a second case of interfering gradient processing according to an embodiment of the invention.
Figure 10:
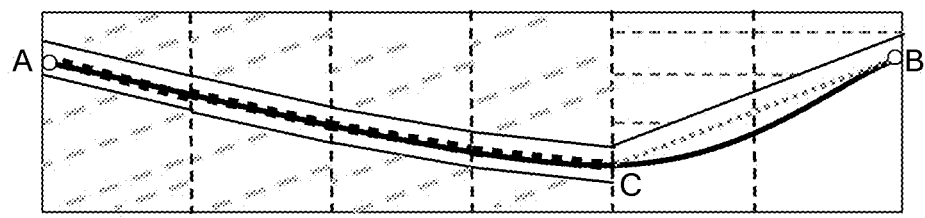
FIG. 10 is an explanatory view illustratively showing an example of a third case of interfering gradient processing according to an embodiment of the invention.

FIGS. 9 and 10 are explanatory views showing illustratively the examples of the second and third cases of interfering gradient process according to an embodiment of the invention, respectively.

As shown in FIG. 9, when for example the evaluation unit 702 determines the approximating straight line segment of the outmost segment is unavailable, the interfering gradient processing unit 302 (700) processes gradient except for the narrow band covering a predetermined width above and under the horizontal line where the corner locates. Moreover, the boundary tracing unit 303 traces a boundary of an object image for the image subjected to the process. Although FIG. 9 shows only a case of approximating from a corner at one end, it may be understood that the processing method shown in FIG. 9 is also applicable for the case of approximating simultaneously from corners at both ends.

In addition, when approximating is only started from a corner at one end, until an approximating straight line segment of a certain segment is unavailable, the interfering gradient processing unit 302 may connect an end point of an approximating straight line segment of the last segment for which the approximating is available to a corner at the other end, and to process the gradient of the connecting line at the side where the boundary does not exist.

In the embodiment as shown in FIG. 10, approximating has been performed successfully for the boundary for the former four segments starting from the corner A. At this time, gradient in a predetermined region except for the narrow band covering the approximating straight line segment may be processed in the interfering gradient processing manner shown in FIG. 8 for each of the four segments starting from the corner A in FIG. 10. In addition, since the boundary-approximating straight line of the fifth segment is not obtained successfully, the interfering gradient processing unit 302 may connect an end point C of an approximating straight line segment of the last (the fourth) segment for which the approximating is available to a corner B at the other end, and to process the gradient of the connecting line at the side where the boundary does not exist.

For a document image, considering the fact that distortion occurs badly to the boundary at the side near the document banding line, the pre-process of locating a boundary of the boundary near the banding line and reducing or removing the interfering gradient near the location may not be performed, and in the same manner as shown in FIG. 10, the end point (C) of the obtained approximating straight line segment nearest to the document banding line is connected to the corner (B) on the banding line, and the gradient of the connecting line of the C, B at the side where the boundary does not exist is processed. Examples will be given for such an embodiment in detail later.

In addition, in another embodiment, when approximating is started simultaneously from corners at both ends, and an approximation of a segment at a certain side or at both sides is unavailable, the interfering gradient processing unit connects an end point of an approximating straight line segment of the last segment for which the approximating is available to an end point of an approximating straight line segment of the last segment for which the approximating is available at the other side, and to process the gradient of the connecting line at the side where the boundary does not exist. In case of a complex boundary curve, a boundary may exist at both sides of the connecting line of C, B. In such a case, the interfering gradient processes performed for segments 5, 6 referring to FIG. 10 are not performed.

The above embodiments are all described by referring to the document scanning image shown in FIG. 1. However, after reading through the disclosure, those skilled in the art shall appreciate that the technique involved in the disclosure is not limited to boundary tracing of a document image, and may be applied to boundary tracing of other specific object images, as long as the boundary of the object image is continuous, and the rate of change in slope between adjacent points is slow.

The image processing device tracing a boundary of a document image may be integrated into a scanner to implement subsequent process on the scanned image obtained by the scanner.

Figure 11:
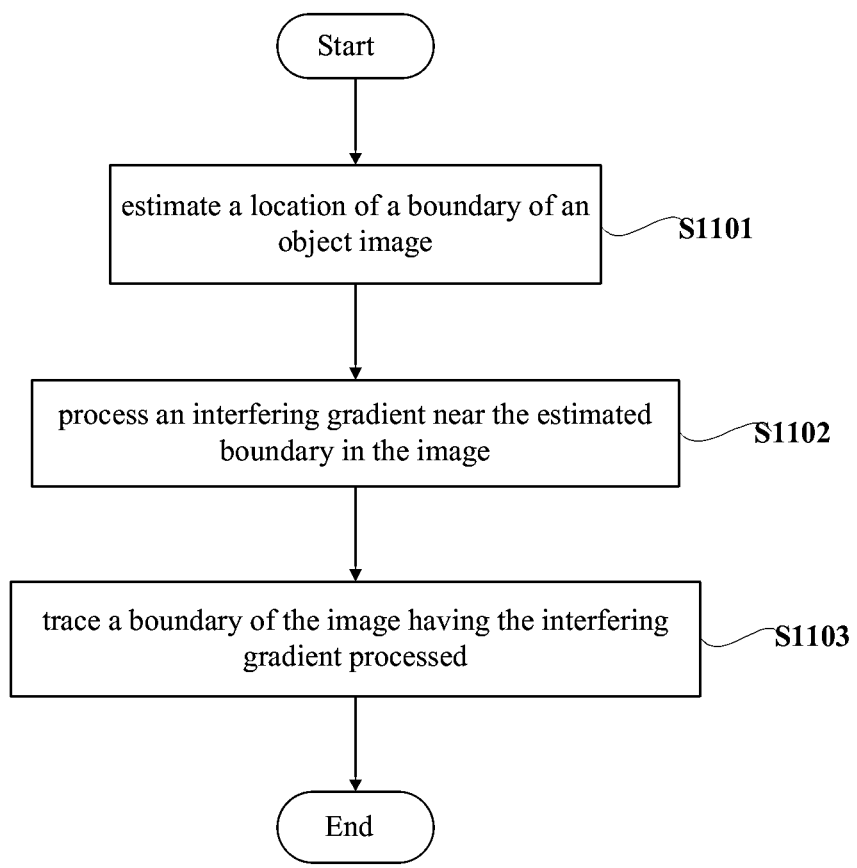
FIG. 11 is a flowchart showing a processing procedure of the boundary tracing method according to an embodiment of the invention.

FIG. 11 is a flowchart showing a processing procedure of the boundary tracing method according to an embodiment of the invention. By using the method, it is possible to trace a boundary of an object image in an image input from an image obtaining device or reading from a memory device, particularly a boundary of an object image where the boundary is continuous and the rate of change in slope between adjacent points is slow.

In step S1101, a location of a boundary of an object image is estimated. Take the document image shown in FIG. 1 as an example, locations of the upper and lower boundaries of the document image may be estimated to locate preliminary a boundary of the document to facilitate to perform subsequent gradient reducing or removing operation. The location of the boundary of the document may be estimated by using various methods known in the art. For example, the preliminary boundary detecting technique such as Sobel operator may be used. A location of a boundary may even by marked manually on a document image.

In step S1102, an interfering gradient near the estimated boundary is processed to reduce or remove an interfering gradient from an image. After the location of the estimated boundary is obtained, the interfering gradient near the position may be reduced or removed selectively. For example, when the location of the lower boundary of the document image in FIG. 1 has been estimated, the gradient of all of the pixels in the adjacent regions above the lower boundary may be reduced or removed. Similarly, when there is other texture on the background of the document image, the gradient of all of the pixels in the adjacent region under the lower boundary may be reduced or removed. The specific examples of reducing or removing an interfering gradient have been described above.

In step S1108, a boundary of an object image for the image having the interfering gradient processed is traced. For example, for a document image having the interfering gradient processed, boundary tracing process may be performed by using various boundary tracing technologies well known in the art such as the dynamic planning.

Since the accuracy of the location of the estimated boundary affects greatly the validity of processing an interfering gradient and thus affects greatly an accuracy of boundary tracing, various known methods may be used to improve an accuracy of a location of an estimated boundary.

In an embodiment, a portion of the image between two corners on the boundary may be segmented into a predetermined number of segments. Then, a location of a boundary is estimated for each of the segmented segments.

In case of two given corners, a predetermined number of segments on the boundary may be obtained in a simplest manner: segmenting evenly a segment between two corners using a segmentation line perpendicular to a connecting line of two corners to segment a boundary curve. For example, as the example shown in FIG. 4, the boundary curve is segmented into 6 segments. Of course, any other segmentation manner may be selected on the basis of a design demand. For instance, a boundary may be segmented by a segment line inclined to a connecting line of two corners or by segmenting unevenly a connecting line of corners. The number of the segment segmented is determined upon a distance between corners at both ends of the boundary, required boundary estimation preciseness, etc. For example, 5 to 20 segments may be selected. A compromise is made between the system calculation amount and the boundary estimation preciseness.

A corner of a boundary may be determined in different manners. For example, a corner of a boundary may be detected automatically by using various corner detecting methods well known in the art. Or, a corner is determined by a manual input.

A location of a boundary may be estimated automatically or inputting-manually using various well known methods for each of the segmented segments. In an example, the boundary in each of the segments may be approximated using a straight line segment, and usability of an approximating straight line segment obtained is evaluated to obtain the estimated boundary location. Descriptions will be given specifically by examples.

At first, boundary-approximating process may be performed from the outermost segment (that is, the segment where the corner locates) among all of the segments. According to a characteristic of a boundary of an object image and a designing requirement, boundary-approximating may be selected to be performed from two outermost segments or from one outermost segment. In conjunction with the embodiment shown in FIG. 5, boundary-approximating is only performed from the outermost segment of the document where corner A away from the binding line locates, considering distortion occurs badly to a boundary near the document binding line.

Specifically, the corner A in the outermost segment may be set as a start point of a straight line segment used to approximate the boundary in the outermost segment, and an end point for the boundary-approximating straight line segment is selected on a segmentation line a1 resulting in the outermost segment, so that in a gradient histogram of a narrow band covering the first straight line segment, pixels exhibit the greatest degree of concentration with respect to the greatest gradient. As to "pixels exhibit the greatest degree of concentration with respect to the greatest gradient", descriptions have been given above by examples by referring to formulae (1) and (2), and detailed descriptions are omitted here.

When an end point of a boundary-approximating straight line segment on a segment line a1 in the outermost segment has been obtained, the obtained end point may be set as a start point of a straight line segment used to approximate the boundary in a next, adjacent segment. Then, an end point for the straight line segment used to approximate may be selected on a segmentation line (a2) which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient. By analogy, approximating straight line segments of all of the segments of boundaries between two corners are finally obtained.

In case of less demanding on the accuracy of boundary estimating, interfering gradient reducing or removing process may be performed directly after an approximating straight line segment of the boundary of the segment is obtained, without performing any evaluation or validation.

However, to improve accuracy of boundary estimating, the usability of the obtained approximating straight line segment may be evaluated. Evaluating usability of the approximating straight line segment, that is, is to determine whether the approximating straight line segment approaches sufficiently a real boundary, or, to determine whether the possibility that the approximating straight line segment approaches sufficiently a real boundary is high enough. Evaluation may be performed by using various determination means and standards well known in the art. For example, an evaluation may be made by using a relation between a degree at which the pixels concentrate on the greatest gradient and the predetermined degree as a standard. Or, for example, an evaluation is made by using a difference between inclination angles of the obtained possible approximating straight line segment and the approximating straight line segment of the previous segment as a standard. When it is determined that the approximating straight line segment is available, the approximating straight line segment may be used as an estimated location of the boundary, to process an interfering gradient near the location in the image. When it is determined that the approximating straight line segment is unavailable, whether to process gradient near the approximating straight line segment may be selected according to actual requirements. Descriptions will be given later by examples.

In an embodiment, evaluation may be made based on whether the gradient near the location where the approximating straight line segment of the boundary locates is black enough. For example, whether a degree at which the pixels concentrate on the greatest gradient is larger than or equal to a predetermined degree in a gradient histogram of the narrow band covering the approximating straight line segment may be determined. When the concentration degree is larger than or equal to a predetermined degree, it is determined that the approximating straight line segment of the boundary is available; and when the concentration degree is smaller than a predetermined degree, it is determined that the approximating straight line segment of the boundary is unavailable. In case of using an inverse gradient map, whether a degree at which the pixels concentrate on the greatest gradient is larger than or equal to a predetermined degree may be evaluated by using for example a gradient k of α fractile described in conjunction with formula 1. For example, in an embodiment, when k is smaller than or equal to the threshold Th1, it may be deemed that a degree at which the pixels concentrate on the greatest gradient is larger than or equal to the predetermined degree; when k is larger than the threshold Th1, it may be deemed that a degree at which the pixels concentrate on the greatest gradient is smaller than the predetermined degree. The value of the threshold Th1 may be a value smaller than or equal to 245, preferably between 128 and 255.

When the approximating straight line segment of the boundary is determined to be available, alternatively, usability of the approximating straight line segment may be further validated. For instance, an inclination angle of a newly-obtained approximating straight line segment may be compared with an inclination angle of an approximating straight line segment in a previous, adjacent segment. When the difference between the inclination angles is smaller than or equal to a predetermined threshold Th2, it is determined that the approximating straight line segment is available; when the difference between the inclination angles is larger than the predetermined threshold Th2, it is determined that the approximating straight line segment is not available. According to specific conditions, Th2 may be a value between 0 degree and 90 degrees, for example, Th2 may be 8 degrees.

As shown in FIG. 6, when it is given that the boundary is continuous and a rate of change in slope between adjacent points is slow, when the approximating straight line segment approaches sufficiently a real boundary, the change in inclination angles of the approximating straight line segments of two adjacent segments is very small. That is, the difference between inclination angles of approximating straight line segments of two adjacent segments will be smaller than the predetermined threshold Th2.

Next, an interfering gradient process is performed on the basis of the result of the boundary approximating for processing gradient near the approximating straight line segments in each of the segments. For example, reduce or remove all of the gradients in a predetermined region except for the narrow band covering the approximating straight line segment, as shown in the former two segments counted from the left in FIG. 8.

In one case, take a document image as an example, in case that approximating straight line segments of two segments have been obtained successfully starting from the outermost corner, an interfering gradient process may be performed on the two segments. The specific processing method may be the following: for each of the segments, reducing or removing gradient in a predetermined region (as the rectangular region near the boundary shown in FIG. 8) except for the narrow band covering the approximating straight line segment. The processed portion is shown by the hatching portion. The predetermined region to which the gradient process is performed may be set on the basis of a characteristic of an object image and a distribution characteristic of an interfering content.

In another case, when for example it is determined that the approximating straight line segment of the outmost segment is unavailable, gradient except for the narrow band covering a predetermined width above and under the horizontal line where the corner locates may be reduced or removed, and a boundary of an object image of the image having the gradient reduced or removed is traced. As shown in FIG. 9, although FIG. 9 shows only a case of approximating from a corner at one end, it may be understood that the processing method shown in FIG. 9 is also applicable for the case of approximating simultaneously from corners at both ends.

In addition, when approximating is only started from a corner at one end, until an approximating straight line segment of a certain segment is unavailable, an end point of an approximating straight line segment of the last segment for which the approximating is available may be connected to a corner at the other end, and the gradient of the connecting line at the side where the boundary does not exist is processed.

In yet another case, boundary-approximating has been performed successfully for the former four segments starting from the corner A. At this time, gradient in a predetermined region except for the narrow band covering the approximating straight line segment may be reduced or removed in the interfering gradient processing manner shown in FIG. 8 for each of the four segments starting from the corner A in FIG. 10. In addition, since the boundary-approximating straight line segment of the fifth segment is not obtained successfully, an end point C of an approximating straight line segment of the last segment (the fourth segment) for which the approximating is available may be connected to a corner B at the other end, and the gradient of the connecting line at the side where the boundary does not exist is processed.

For a document image, considering the fact that distortion occurs badly to the boundary at the side near the document banding line, the pre-process of locating a boundary of the boundary near the banding line and reducing or removing the interfering gradient near the location may not be performed, and in the same manner as shown in FIG. 10, the end point (C) of the obtained approximating straight line segment nearest to the document banding line is connected to the corner (B) on the banding line, and the gradient of the connecting line of the C, B where the boundary does not exist is processed.

In addition, in another embodiment, when approximating is started simultaneously from corners at both ends, and an approximation of a segment at a certain side or at both sides is unavailable, the interfering gradient processing unit connects an end point of an approximating straight line segment of the last segment for which the approximating is available to an end point of an approximating straight line segment of the last segment for which the approximating is available at the other side, and to process the gradient of the connecting line at the side where the boundary does not exist.

Figure 12:
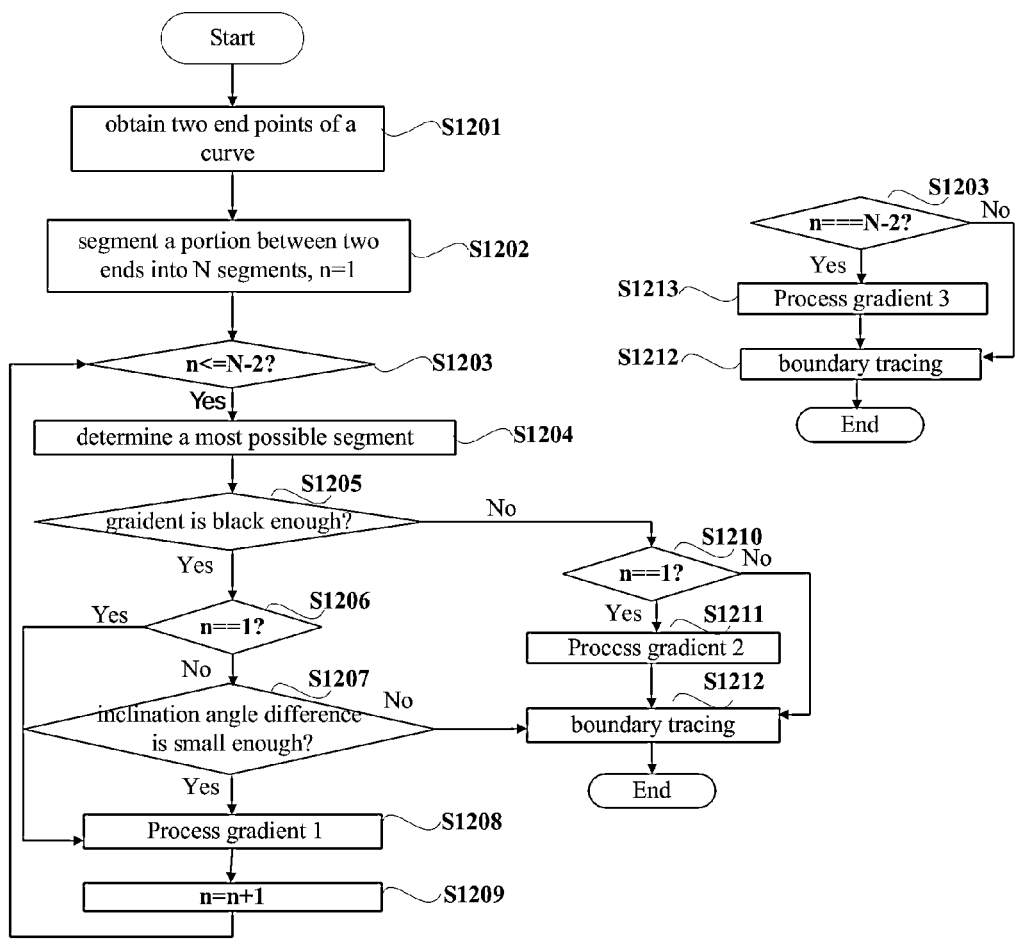
FIG. 12 is a flowchart illustratively showing an example of a document boundary tracing process performed on the document image, for example, shown in FIG. 1.

A specific application of the invention is described by referring to FIG. 12. FIG. 12 is a flow chart illustratively showing a document boundary tracing process performed on the document image shown in FIG. 1.

In an embodiment, boundary tracing may be performed for upper and lower boundaries at the left side and the right side of the document binding line. The lower boundary at the left side of the document binding line is taken an example.

In step S1201, two end points of the lower boundary curve are obtained. A corner may be extracted automatically or a location of the corner may be input manually.

In step S1202, in any manner, for example, a number of segmenting lines perpendicular to the connecting line of two end points may be used to segment the boundary curve into N segments; and a value is assigned to the variable n (n=0 ... N) to make n=1.

In step S1203, whether n is smaller than or equal to N−2 is determined. When it is determined in step S1203 that n is smaller than or equal to N−2, in step S1204, a straight line segment is used to approximate a boundary in the nth segment to obtain an approximating straight line segment of the boundary.

Next, the most possible approximating straight line segment obtained finally is evaluated. In step S1205, determine whether the gradient of the location where the obtained approximating straight line segment locates is intense enough. When it is determined in step S1205 that the gradient of the location where the obtained approximating straight line segment locates is intense enough, in step S1206, whether n is equal to 1 is determined. If n=1, proceed to step S1208, for example, as the description given by referring to FIG. 8, gradient except for the narrow band covering the approximating straight line segment (for the sake of conciseness, it is referred to as "process gradient 1" hereinafter) is reduced or removed.

If it is determined in step S1206 that n is not equal to 1, the process proceeds to step S1207 to determine whether the difference between the inclination angle of the approximating straight line segment of the nth segment and the inclination angle of the straight line segment of the (n−1)th segment that has been approximated successfully is smaller enough. If it is smaller enough, the process proceeds to step S1208 to process gradient 1. Then, the process proceeds to step S1209 to make n increase by 1. Then the process returns back to step S1203 to determine whether n is smaller than or equal to N−2.

When No is determined in step S1205, that is, the gradient of the location where the obtained approximating straight line segment locates is not intense enough, that is, the approximating straight line segment is unavailable, the process proceeds to step S1210 to determine whether n is equal to 1. If n=1, the process proceeds to step S1211, as the description given by referring to FIG. 9, to process a gradient except for the narrow band covering a predetermined width above and under the horizontal line where the end point locates (for the sake of conciseness, it is referred to as "process gradient 2" hereinafter). Then, the process proceeds to step S1212 to stop a pre-process of estimating a boundary and processing the interfering gradient, and to trace a boundary of the document image having the interfering gradient processed.

When n is not equal to 1, the pre-process of estimating a boundary and processing an interfering gradient is stopped, and step S1212 is performed directly to start tracing a boundary of the document image.

In addition, when it is determined in step S1207 that the difference between the inclination angles is relatively large, the pre-process of estimating a boundary and processing an interfering gradient is stopped, and step S1212 is performed directly to start tracing a boundary of the document image.

Considering that distortion occurs badly to the document boundary near the binding line, when it is found in the determination step in S1203 that n is equal to N−2, the process proceeds to step S1213. In step S1213, as the description given by referring to FIG. 10, an end point of the approximating straight line segment obtained in the (N−2)th segment is connected to an end point of the boundary located on the binding line, and the content gradient in the region above the connecting line (for the sake of conciseness, it is called as "process gradient 3" hereinafter) is processed.

Then, the process proceeds to step S1212 to stop the pre-process of estimating a boundary and processing an interfering gradient, and to start tracing a boundary of the document image.

Here, it is noted that in some embodiments, step S1206 may be omitted. An pre-estimated inclination angle may be used to compare the inclination angles when evaluating the approximating straight line segment of the first segment.

Figure 13:
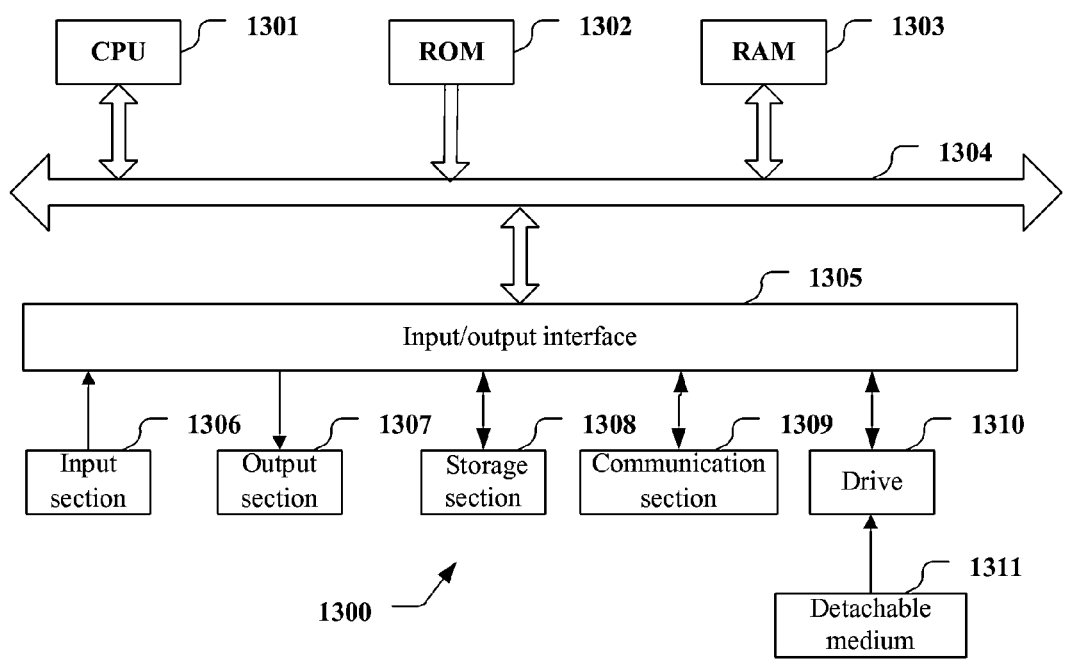
FIG. 13 is a block diagram showing an example structure of a computer implementing the invention.

Hereinafter, referring to FIG. 13, the example structure of a computer implementing the data processing device of the invention will be described. FIG. 13 is a block diagram showing an example structure of the computer implementing the invention.

In FIG. 13, a central processing unit (CPU) 1301 performs various processes according to the program stored in the Read-Only Memory (ROM) 1302 or programs loaded from the storage section 1308 to the Random Access Memory (RAM) 1303. In the RAM 1303, data required when the CPU 1301 performs various processes is also stored as required.

CPU 1301, ROM 1302 and RAM 1303 are connected from one to another via bus 1304. Input/output interface 1305 is also connected to the bus 1304.

The following components are connected to the input/output interface 1305: input section 1306 (including keyboard, mouse, etc.); output section 1307 (including display, such as cathode ray tube (CRT), liquid crystal display (LCD), etc., and speakers and so on); storage section 1308 (including hard disc, etc.); and communication part 1309 (including network interface cards such as LAN cards, modems and so on). The communication section 1309 performs communication processes via network like the internet.

According to requirements, drive 1310 is also connected to the input/output interface 1305. Detachable medium 1311 such as magneto disk, optical disk, magneto-optical disk, semiconductor memory, and so on may be installed on the drive 1310 based on requirements, such that the computer program read out therefrom is installed in the storage section 1308 based on requirements.

In case of implementing the above steps and processes by software, programs constituting the software are installed from a network like the Internet or from a storage medium like the detachable medium 1311.

Those skilled in the art should understand that such storage medium is not limited to the detachable medium 1311 which is stored with programs and distributed separately from the method to provide a user with program as shown in FIG. 13. The example of the detachable medium 1311 includes magneto disk, optical disk (including CD read only memory (CD-ROM) and digital versatile disc (DVD)), magneto-optical disk (including mini-disk (MD)) and semiconductor memory. Alternatively, the storage medium may be ROM 1302, or hard disk included in the storage section 1308 in which a program is stored and the program is distributed to a user with the method including the same.

In the description of the specific embodiments of the invention, features descried and/or shown in one embodiment may be used in one or more other embodiments in a same or similar manner, or may be combined with features in other embodiments, or may replace features in other embodiments.

It shall be emphasized that the technical term "comprise/include" is used here to refer to an existence of a feature, an element, a step or a component, without excluding existences or addition of one or more other features, elements, steps or components. Terms "first", "second" relating to the ordinal number do not indicate the execution order or the degree of importance of the features, the elements, the steps or the components defined by those terms, and are configured to identify among the features, the elements, the steps or the components for the sake of clearness.

In addition, the method of various embodiments of the invention is not limited to be executed by the temporal order provided in the Description and shown in the drawings, and the method may be executed sequentially by other time order, in parallel or independently. Therefore, the order of executing the method described in the Description does not limit the scope of protection of the invention.

In conclusion, according to embodiments of the invention, the invention provides the following solutions:

1. An image processing device for tracing a boundary of an object image in an image, the boundary being continuous and the rate of change in slope between adjacent points on the boundary being slow, the image processing device comprising:

a boundary estimation unit, adapted to estimate the location of the boundary of the object image;

an interfering gradient processing unit, adapted to process an interfering gradient near the estimated boundary, so as to reduce the interfering gradient or remove the interfering gradient from the image; and a boundary tracing unit, adapted to trace the boundary in the image having the interfering gradient processed.

2. The image processing device according to Appendix 1, wherein the boundary estimation unit comprises:

a segmentation unit, adapted to segment a portion of the image between two corners on the boundary into a predetermined number of segments; and a segment boundary estimation unit, adapted to estimate the location of the boundary respectively in each of the segments.

3. The image processing device according to Appendix 2, wherein the segment boundary estimation unit comprises a boundary approximation unit for approximating the boundary in each of the segments using a straight line segment, wherein the boundary approximation unit is adapted to, for at least one of outermost segments where the corners are in respectively, set the corner in the outermost segment as a start point of a first straight line segment used to approximate the boundary in the outermost segment, and select an end point for the first straight line segment on a first segmentation line resulting in the outermost segment, so that in a gradient histogram of a narrow band covering the first straight line segment, pixels exhibit the greatest degree of concentration with respect to the greatest gradient; and the boundary approximation unit is further adapted to set the obtained end point of the boundary-approximating straight line segment as a start point of a second straight line segment used to approximate the boundary in a next, adjacent segment, and select an end point for the second straight line segment on a second segmentation line which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient.

4. The image processing device according to Appendix 3, wherein the segment boundary estimation unit further comprises an evaluation unit adapted to evaluate usability of an approximating straight line segment obtained by the boundary approximation unit.

5. The image processing device according to Appendix 4, wherein the evaluation unit comprises: a concentration degree evaluation unit, adapted to determine whether a degree at which the pixels concentrate on the greatest gradient is larger than or equal to a predetermined degree, and if it is larger than or equal to the predetermined degree, the concentration degree evaluation unit determines that the approximating straight line segment of the boundary is available; otherwise, the concentration degree evaluation unit determines the approximating straight line segment of the boundary is unavailable.

6. The image processing device according to Appendix 4 or 5, wherein the evaluation unit comprises: an inclination angle evaluation unit, adapted to compare an inclination angle of a newly-obtained approximating straight line segment with an inclination angle of an approximating straight line segment in a previous, adjacent segment, and if the difference between the inclination angles is smaller than or equal to a predetermined threshold, the inclination angle evaluation unit determines the approximating straight line segment is available; otherwise, the inclination angle evaluation unit determines the approximating straight line segment is not available.

7. The image processing device according to any one of Appendixes 3-6, wherein the interfering gradient processing unit is adapted to process an interfering gradient near the approximating straight line segment for each of the segments.

8. The image processing device according to Appendix 7, wherein, the interfering gradient processing unit processes gradient in a predetermined region except for a narrow band covering the approximating straight line segment.

9. The image processing device according to any one of Appendixes 4 to 6, wherein, when an approximating straight line segment in the outermost segment is unavailable, the interfering gradient processing unit is adapted to process gradients except for the narrow band covering a predetermined width above and under a horizontal line where corners are in; and the boundary tracing unit is adapted to trace a boundary of an object image of the image subjected to the process.

10. The image processing device according to any one of Appendixes 4 to 6, wherein, when approximating is only started from a corner at one end, and an approximating straight line segment of a certain segment is unavailable, the interfering gradient processing unit is adapted to connect an end point of an approximating straight line segment of the last segment for which the approximating is available to a corner at the other end, and to process the gradient of the connecting line at the side where the boundary does not exist.

11. The image processing device according to any one of Appendixes 4 to 6, wherein, when approximating is started simultaneously from corners at both ends, and an approximation of a segment at a certain side or at both sides is unavailable, the interfering gradient processing unit is adapted to connect an end point of an approximating straight line segment of the last segment for which the approximating is available to an end point of an approximating straight line segment of the last segment for which the approximating is available at the other side, and to process the gradient of the connecting line at the side where the boundary does not exist.

12. The image processing device according to any one of Appendixes 1 to 11, wherein the object image is a document image.

13. A scanner, comprising the image processing device according to any one of Appendixes 1-12.

14. An image processing method of tracing a boundary of an object image in an image, the boundary being continuous and the rate of change in slope between adjacent points on the boundary being slow, the image processing method comprises:

a boundary estimation step, of estimating the location of the boundary of the object image;

an interfering gradient processing step, of processing an interfering gradient near the estimated boundary, so as to reduce the interfering gradient or remove the interfering gradient from the image; and a boundary tracing step, of tracing the boundary in the image having the interfering gradient processed.

15. The image processing method according to Appendix 14, wherein, the boundary estimation step comprises:

a segmentation step of segmenting a portion of the image between two corners on the boundary into a predetermined number of segments;

a segment boundary estimation step of estimating the location of the boundary respectively in each of the segments.

16. The image processing method according to Appendix 15, wherein the segment boundary estimation step comprises a boundary approximating step of approximating the boundary in each of the segments using a straight line segment, the boundary approximating step comprising:

for at least one of outermost segments where the corners are in respectively, setting the corner in the outermost segment as a start point of a first straight line segment used to approximate the boundary in the outermost segment, and selecting an end point for the first straight line segment on a first segmentation line resulting in the outermost segment, so that in a gradient histogram of a narrow band covering the first straight line segment, pixels exhibit the greatest degree of concentration with respect to the greatest gradient; and setting the obtained end point of the boundary-approximating straight line segment as a start point of a second straight line segment used to approximate the boundary in a next, adjacent segment, and selecting an end point for the second straight line segment on a second segmentation line which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient.

17. The image processing method according to Appendix 16, wherein the segment boundary estimation step further comprises an evaluation step of evaluating usability of the obtained approximating straight line segment.

18. The image processing method according to Appendix 17, wherein the evaluation step comprises: determining whether a degree at which the pixels concentrate on the greatest gradient is larger than or equal to a predetermined degree, and if it is larger than or equal to the predetermined degree, determining that the approximating straight line segment of the boundary is available; if it is smaller than the predetermined degree, determining that the approximating straight line segment of the boundary is unavailable.

19. The image processing method according to Appendix 17 or 18, wherein, the evaluation step comprises: comparing an inclination angle of a newly-obtained approximating straight line segment with an inclination angle of an approximating straight line segment in a previous, adjacent segment, and if the difference between the inclination angles is smaller than or equal to a predetermined threshold, determining the approximating straight line segment is available; if the difference between the inclination angles is larger than a predetermined threshold, determining the approximating straight line segment is unavailable.

20. The image processing method according to any of Appendixes 16 to 19, wherein, interfering gradients near the approximating straight line segments in each of the segments are processed respectively in the interfering gradient processing step.

21. The image processing method according to Appendix 20, wherein, gradient in a predetermined region except for the narrow band covering the approximating straight line segment is processed in the interfering gradient processing step.

22. The image processing method according to any of Appendixes 17 to 19, wherein, when an approximating straight line segment in the outermost segment is unavailable, in the interfering gradient processing step, gradients except for the narrow band covering a predetermined width above and under a horizontal line where corners are in are processed; and in the boundary tracing step, a boundary of an object image of the image subjected to the process is traced.

23. The image processing method according to any of Appendixes 17 to 19, wherein, when approximating is only started from a corner at one end, and an approximating straight line segment of a certain segment is unavailable, in the interfering gradient processing step, an end point of an approximating straight line segment of the last segment for which the approximating is available is connected to a corner at the other end, and the gradient of the connecting line at the side where the boundary does not exist is processed.

24. The image processing method according to any of Appendixes 17 to 19, wherein, when approximating is started simultaneously from corners at both ends, and an approximation of a segment at a certain side or at both sides is unavailable, in the interfering gradient processing step, an end point of an approximating straight line segment of the last segment for which the approximating is available is connected to an end point of an approximating straight line segment of the last segment for which the approximating is available at the other side, and the gradient of the connecting line at the side where the boundary does not exist is processed.

25. The image processing method according to any of Appendixes 14 to 24, wherein the object image is a document image.

26. A computer-readable storage medium, having a computer program stored thereon when executed instructing a computer to perform a process for tracing a boundary of an object image in an image, the boundary being continuous and the rate of change in slope between adjacent points on the boundary is slow, wherein the process comprises:
estimating the location of the boundary of the object image;
processing an interfering gradient near the estimated boundary, so as to reduce the interfering gradient or remove the interfering gradient from the image; and
tracing the boundary in the image having the interfering gradient processed.

The invention claimed is:
1. An image processing device for tracing a boundary of an object image in an image, the boundary being continuous and the rate of change in slope between adjacent points on the boundary being slow, the image processing device comprising:
a boundary estimation unit, adapted to estimate the location of the boundary of the object image;
an interfering gradient processing unit, adapted to process an interfering gradient near the estimated boundary, so as to reduce the interfering gradient or remove the interfering gradient from the image; and
a boundary tracing unit, adapted to trace the boundary in the image having the interfering gradient processed;
wherein the boundary estimation unit comprises:
a segmentation unit, adapted to segment a portion of the image between two corners on the boundary into a predetermined number of segments;
a segment boundary estimation unit, adapted to estimate the location of the boundary respectively in each of the segments;
wherein the segment boundary estimation unit comprises a boundary approximation unit for approximating the boundary in each of the segments using a straight line segment,
wherein the boundary approximation unit is adapted to, for at least one of outermost segments where the corners are in respectively, set the corner in the outermost segment as a start point of a first straight line segment used to approximate the boundary in the outermost segment, and select an end point for the first straight line segment on a first segmentation line resulting in the outermost segment, so that in a gradient histogram of a narrow band covering the first straight line segment, pixels exhibit the greatest degree of concentration with respect to the greatest gradient; and the boundary approximation unit is further adapted to set the obtained end point of the boundary-approximating straight line segment as a start point of a second straight line segment used to approximate the boundary in a next, adjacent segment, and select an end point for the second straight line segment on a second segmentation line which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient.

2. The image processing device according to claim 1, wherein the segment boundary estimation unit further comprises an evaluation unit adapted to evaluate usability of an approximating straight line segment obtained by the boundary approximation unit.

3. The image processing device according to claim 2, wherein the evaluation unit comprises: a concentration degree evaluation unit, adapted to determine whether a degree at which the pixels concentrate on the greatest gradient is larger than or equal to a predetermined degree, and if it is larger than or equal to the predetermined degree, the concentration degree evaluation unit determines that the approximating straight line segment of the boundary is available; otherwise, the concentration degree evaluation unit determines the approximating straight line segment of the boundary is unavailable.

4. The image processing device according to claim 2, wherein the evaluation unit comprises: an inclination angle evaluation unit, adapted to compare an inclination angle of a newly-obtained approximating straight line segment with an inclination angle of an approximating straight line segment in a previous, adjacent segment, and if the difference between the inclination angles is smaller than or equal to a predetermined threshold, the inclination angle evaluation unit determines the approximating straight line segment is available; otherwise, the inclination angle evaluation unit determines the approximating straight line segment is not available.

5. The image processing device according to claim 1, wherein the interfering gradient processing unit is adapted to process an interfering gradient near the approximating straight line segment for each of the segments.

6. The image processing device according to claim 5, wherein, the interfering gradient processing unit processes gradient in a predetermined region except for a narrow band covering the approximating straight line segment.

7. The image processing device according to claim 2, wherein, when an approximating straight line segment in the outermost segment is unavailable, the interfering gradient processing unit is adapted to process gradients except for the narrow band covering a predetermined width above and under a horizontal line where corners are in; and the boundary tracing unit is adapted to trace a boundary of an object image of the image subjected to the process.

8. The image processing device according to claim 2, wherein, when approximating is only started from a corner at one end, and an approximating straight line segment of a certain segment is unavailable, the interfering gradient processing unit is adapted to connect an end point of an approximating straight line segment of the last segment for which the approximating is available to a corner at the other end, and to process the gradient of the connecting line at the side where the boundary does not exist.

9. The image processing device according to claim 2, wherein, when approximating is started simultaneously from corners at both ends, and an approximation of a segment at a certain side or at both sides is unavailable, the interfering gradient processing unit is adapted to connect an end point of an approximating straight line segment of the last segment for which the approximating is available to an end point of an approximating straight line segment of the last segment for which the approximating is available at the other side, and to process the gradient of the connecting line at the side where the boundary does not exist.

10. The image processing device according to claim 1, wherein the object image is a document image.

11. A scanner, comprising the image processing device according to claim 1.

12. An image processing method of tracing a boundary of an object image in an image, the boundary being continuous and the rate of change in slope between adjacent points on the boundary being slow, the image processing method comprises:
    a boundary estimation step, of estimating the location of the boundary of the object image;
    an interfering gradient processing step, of processing an interfering gradient near the estimated boundary, so as to reduce the interfering gradient or remove the interfering gradient from the image; and
    a boundary tracing step, of tracing the boundary in the image having the interfering gradient processed;
    wherein, the boundary estimation step comprises:
    a segmentation step of segmenting a portion of the image between two corners on the boundary into a predetermined number of segments;
    a segment boundary estimation step of estimating the location of the boundary respectively in each of the segments;
    wherein the segment boundary estimation step comprises a boundary approximating step of approximating the boundary in each of the segments using a straight line segment, the boundary approximating step comprising:
    for at least one of outermost segments where the corners are in respectively, setting the corner in the outermost segment as a start point of a first straight line segment used to approximate the boundary in the outermost segment, and selecting an end point for the first straight line segment on a first segmentation line resulting in the outermost segment, so that in a gradient histogram of a narrow band covering the first straight line segment, pixels exhibit the greatest degree of concentration with respect to the greatest gradient; and
    setting the obtained end point of the boundary-approximating straight line segment as a start point of a second straight line segment used to approximate the boundary in a next, adjacent segment, and selecting an end point for the second straight line segment on a second segmentation line which results in the next segment and is not common to the next segment and the segment for which the boundary-approximating straight line segment has been obtained, so that in a gradient histogram of a narrow band covering the second straight line segment, pixels exhibit the greatest degree of concentration with respect to the greatest gradient.

13. The image processing method according to claim 12, wherein the segment boundary estimation step further comprises an evaluation step of evaluating usability of the obtained approximating straight line segment.

14. The image processing method according to claim 13, wherein the evaluation step comprises: determining whether a degree at which the pixels concentrate on the greatest gradient is larger than or equal to a predetermined degree, and if it is larger than or equal to the predetermined degree, determining that the approximating straight line segment of the boundary is available; if it is smaller than the predetermined degree, determining that the approximating straight line segment of the boundary is unavailable.

15. The image processing method according to claim 13, wherein, the evaluation step comprises: comparing an inclination angle of a newly-obtained approximating straight line segment with an inclination angle of an approximating straight line segment in a previous, adjacent segment, and if the difference between the inclination angles is smaller than or equal to a predetermined threshold, determining the approximating straight line segment is available; if the difference between the inclination angles is larger than a predetermined threshold, determining the approximating straight line segment is unavailable.

16. The image processing method according to claim 12, wherein, interfering gradients near the approximating straight line segments in each of the segments are processed respectively in the interfering gradient processing step.

* * * * *